United States Patent Office 3,275,699
Patented Sept. 27, 1966

3,275,699
RECOVERY PROCESS FOR A CYCLOHEXADIENE
David G. Walker and William R. Edwards, Baytown, Tex., assignors, by mesne assignments, to Esso Research and Engineering Company, Elizabeth, N.J., a corporation of Delaware
No Drawing. Filed Sept. 9, 1963, Ser. No. 307,330
7 Claims. (Cl. 260—666)

The present invention is directed to an improved process for producing a compound selected from the class consisting of 1-methylene-2,3,4,4,5,6,-hexamethylcyclohexadiene and 1-ethylidene-2,3,4,4,5,6-hexaethylcyclohexadiene. More particularly, the invention deals with the recovery of cyclohexadienes by utilizing a salt sweep. In its more specific aspects a metal halide, wherein the metal of the metal halide is selected from sodium, potassium, calcium and magnesium and the halide is either chlorine or bromine, is mixed with an aluminum chloride or aluminum bromide complex of the cyclohexadienes to produce 1-methylene-2,3,4,4,5,6-hexamethylcyclohexadiene or 1-ethylidene-2,3,4,4,5,6-hexaethylcyclohexadiene.

A method of producing the cyclohexadienes by the alkylation of an alkyl-substituted benzene with methyl chloride and aluminum chloride is described in Edwards et al. U.S. Patent No. 2,951,879, entitled "Cyclohexadienes and Process for Preparing Same," issued September 6, 1960. According to the patent, the cyclohexadienes form a complex with the Friedel-Crafts catalyst in the alkylation reaction which is very slightly soluble in the hydrocarbon components of the charge mixture. The patent further states:

"The complex is contained in the higher density liquid complex phase resulting from the alkylation reaction. The cyclohexadienes may be conveniently recovered by separating the complex phase from the lower density liquid phase at the end of the reaction, treating the complex phase with water at a temperature of less than about 50° F., separating an oil phase from the hydrolysis product, and recovering the cyclohexadiene from the resultant oil phase by any suitable method such as fractional crystallization." (column 1, lines 61 to 70.)

Hence, according to the patent, the desired cyclohexadienes are recovered by the hydrolysis of the complex. In the hydrolysis the aluminum halide goes into an aqueous solution which results in the loss of one mol of aluminum halide ($AlCl_3$ or $AlBr_3$) per mol of organic material recovered. In the present invention, the aluminum halide is not lost in that it is maintained in the anhydrous form suitable for recycling or re-use.

According to the present invention, 1-methylene-2,3,4,4,5,6-hexamethylcyclohexadiene and 1-ethylidene-2,3,4,4,5,6-hexaethylcyclohexadiene are recovered from the complex phase in a simple manner without the loss of the anhydrous aluminum halide. In the practice of the present invention, a salt sweep is used wherein the aluminum halide and hydrogen halide used in the alkylation reaction are recovered in a form suitable to be used again.

In accordance with the present invention a metal halide is reacted with the cyclohexadiene complex with the Friedel-Crafts catalyst. The metal of the metal halide is selected from the group consisting of sodium, potassium, calcium and magnesium and the halide is selected from the group consisting of chlorine and bromine. The reaction of the salt sweep of the present invention is illustrated by the following reactions:

(1)
$(C_{13}H_{21})^+(AlCl_4)^- + NaCl \longrightarrow$

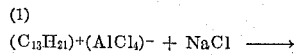
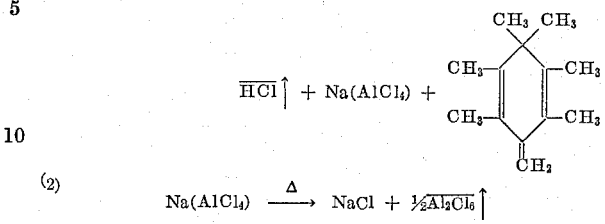

(2)
$Na(AlCl_4) \xrightarrow{\Delta} NaCl + \frac{1}{2}Al_2Cl_6 \uparrow$

Similar reactions may be written for potassium, calcium or magnesium chloride or if the Friedel-Crafts catalyst is aluminum bromide then with the corresponding bromide salts.

As illustrated in the foregoing reactions, the cyclohexadiene complexes are mixed with sodium, potassium, calcium or magnesium chloride or bromide. The complexes and metal halides are mixed at a temperature within the range of about 0° to about 50° C. in an aromatic solvent. A preferred temperature range is between about 20° and about 30° C. The reaction may be speeded up by heating and may be done at temperatures in excess of 50° C.; however, more side reactions occur at excessive temperatures. The aromatic solvent may be benzene, toluene or some other aromatic easily separable from the desired cyclohexadienes. The aromatic solvent is present in an amount such that about 2 to about 6 mols of solvent is used per mol of cyclohexadiene. During the mixing, the hydrogen halide is recovered as a gas; the desired cyclohexadienes are in the liquid phase; and, a solid binary addition compound of the metal halide and aluminum halide is formed.

The cyclohexadienes are recovered from the liquid phase formed in the salt sweep step by a simple separation such as a simple distillation. The solid binary addition compounds of the metal halide and aluminum halide are heated until the anhydrous aluminum halide is removed leaving the metal halide. For example, Na($AlCl_4$) may be heated to about 600° to about 800° C. to recover the aluminum chloride quantitatively.

The invention will be further illustrated by the following specific illustrations which are given by way of illustration and not to limit the scope of this invention.

*Example I*

Prepare a mixture of equal molar amounts of aluminum chloride and durene in a reactor blanketed with nitrogen. Heat the mixture to a temperature of about 200° F. with agitation under essentially anhydrous conditions and then bubble methyl chloride through the resultant complex at that temperature until the methyl chloride consumption ceases. Cool the reaction mixture to room temperature. Allow the oil phase to separate from the complex phase and separate the phases.

*Example II*

A solid sample prepared in a manner similar to Example I and known to contain appreciable amounts of $(C_{13}H_{21})^+(AlCl_4)^-$ and to also contain some of the ternary compound, hexamethylbenzene:$HCl$:$AlCl_4$ (1.21 g.), is mixed in a vacuum with 1.868 g. toluene and 2.80 g. NaCl and sealed off and left shaking at 25° C. overnight. A vacuum is pulled on the mixture the next day distilling off the toluene quantitatively and producing 0.042 g. methyl chloride and 0.26 g. hydrogen chloride. Sublimation of the residue at 100° C. and solvent extraction of the residual NaCl and NaAlCl₄ yields 0.42 g. hexamethylbenzene and 0.42 g. of 1-methylene-2,3,4,4,5,6-hexamethylcyclohexadiene. No other organic compounds are detected except in trace quantity.

*Example III*

The procedure of Example I is followed, but in this instance a mixture of tetraethylbenzenes is employed as the benzenoid starting material and ethyl bromide as the alkyl halide reactant. After cooling the reaction mixture, the complex phase is separated from the oil phase. The complex phase contains the following complex:

$$(C_{20}H_{36})^+(AlBr_4)^-$$

*Example IV*

A solid sample prepared in a manner similar to Example III containing appreciable amounts of $$(C_{20}H_{36})^+(AlBr_4)^-$$

and the ternary compound hexaethylbenzene:HBr:AlBr is mixed in a vacuum with benzene and MgCl₂ and sealed off and left shaking at 25° C. overnight. A vacuum is pulled on the mixture the next day distilling off the benzene with ethylbromide and hydrogen bromide. Paraffin solvent extraction of the residual MgCl₂ and Mg(AlBr₄)₂ yields hexaethylbenzene and 1-ethylidene-2,3,4,4,5,6-hexaethylcyclohexadiene with other organic compounds only in trace quantity.

The foregoing examples were run under alkylation conditions to maximize the production of the desired cyclohexadienes. Furthermore, the examples are intended to illustrate that either aluminum chloride or aluminum bromide may be used as the alkylation catalyst. It is to be noted, however, that the salt sweep may be accomplished with potassium or calcium instead of sodium or magnesium as the metal portion of the metal halides.

It is to be further pointed out that the present invention has application in any alkylation process wherein either aluminum chloride or aluminum bromide is used as the alkylation catalyst. Generally, the alkylation is of an alkyl-substituted benzene such as making xylenes from toluene. In the alkylation process two phases are formed, an upper hydrocarbon phase and a lower phase which contains the aluminum halide catalyst. The upper hydrocarbon phase remains as relatively pure hydrocarbons throughout the reaction; however, the nature of the lower phase changes. As an alkylation process proceeds, a portion of the aromatic hydrocarbons becomes substantially completely alkylated; and, as is evident from the foregoing examples, the completely alkylated aromatic will complex with the aluminum halide catalyst. It has been observed that after a period of time catalytic activity diminishes in an alkylation process, and furthermore a hydrocarbon insoluble phase forms. According to the present invention, this hydrocarbon insoluble phase may be treated by the salt sweep of the present invention whereby the desired 1-methylene-2,3,4,4,5,6-hexamethylcyclohexadiene or 1-ethylidene-2,3,4,4,5,6-hexaethylcyclohexadiene may be recovered.

The nature and objects of the present invention having been completely described and illustrated and the best mode set forth, what we wish to claim as new and useful and secure by Letters Patent is:

1. In the methylation of a methyl-substituted benzene using an aluminum halide as the methylation catalyst wherein a hydrocarbon insoluble phase forms below the hydrocarbon phase, the improvement of:
separating said hydrocarbon insoluble phase from said hydrocarbon phase;
mixing said hydrocarbon insoluble phase with a metal halide wherein said metal of said metal halide is selected from the group consisting of sodium, potassium, calcium and magnesium at a temperature within the range of about 0° to about 50° C. in an aromatic solvent whereby a binary addition compound, a hydrogen halide and 1-methylene-2,3,4,4,5,6-hexamethylcyclohexadiene are formed; and
recovering said 1-methylene-2,3,4,4,5,6-hexamethylcyclohexadiene, said halides being selected from the group consisting of chlorine and bromine.

2. A method in accordance with claim 1 wherein aluminum halide is recovered from said binary addition compound.

3. A method in accordance with claim 1 wherein said mixing is at a temperature within the range of about 20° to about 30° C.

4. A method for preparing 1-methylene-2,3,4,4,5,6-hexamethylcyclohexadiene which comprises:
methylating a methyl-substituted benzene under alkylation conditions using an aluminum halide catalyst forming a hydrocarbon insoluble phase;
mixing a metal halide wherein the metal of said metal halide is selected from the group consisting of sodium, potassium, calcium and magnesium at a temperature within the range of about 0° to about 50° C. with said hydrocarbon insoluble phase in an aromatic solvent whereby said cyclohexadiene is formed; and
recovering said 1-methylene-2,3,4,4,5,6-hexamethylcyclohexadiene from said aromatic solvent.

5. A method in accordance with claim 4 wherein said mixing is at a temperature within the range of about 20° to about 30° C.

6. A method in accordance with claim 4 wherein said halide is chlorine.

7. A method for preparing 1-ethylidene-2,3,4,4,5,6-hexaethylcyclohexadiene which comprises:
ethylating an ethyl-substituted benzene under alkylation conditions using an aluminum halide catalyst forming a hydrocarbon insoluble phase;
mixing a metal halide wherein the metal of said metal halide is selected from the group consisting of sodium, potassium, calcium and magnesium at a temperature within the range of about 0° to about 50° C. with said hydrocarbon insoluble phase in an aromatic solvent whereby said cyclohexadiene is formed; and
recovering said 1-ethylidene-2,3,4,4,5,6-hexaethylcyclohexadiene from said aromatic solvent.

References Cited by the Examiner

UNITED STATES PATENTS

| | | | |
|---|---|---|---|
| 2,271,299 | 1/1942 | Ipatieff et al. | 260—671 |
| 2,388,007 | 10/1945 | Pardee et al. | 260—671 |
| 2,951,879 | 9/1960 | Edwards | 260—666 |

OTHER REFERENCES

F. H. Blunck et al.; Ind. Eng. Chem., 32, No. 3, pp. 328–330, 1940.

DELBERT E. GANTZ, *Primary Examiner.*

V. O'KEEFE, *Assistant Examiner.*